United States Patent

[11] 3,570,463

| [72] | Inventor | Daniel E. Nelson<br>Box 576, Pacific Grove, Calif. 93933 |
|---|---|---|
| [21] | Appl. No. | 870,644 |
| [22] | Filed | Jan. 12, 1970 |
| [45] | Patented | Mar. 16, 1971 |
| | | Continuation-in-part of application Ser. No. 437,682, Mar. 8, 1965, now abandoned, and a continuation-in-part of 656,437, July 27, 1967, now abandoned, and a continuation-in-part of 684,377, Nov. 20, 1967, now abandoned. |

[54] REGENERATIVE COMBUSTION CYCLE PISTON ENGINE
11 Claims, 9 Drawing Figs.

[52] U.S. Cl. .................................................. 123/122D,
123/41.17, 123/41.67, 123/41.68, 123/41.58,
123/61, 123/62, 123/63, 123/65, 123/70, 123/71
[51] Int. Cl. .................................................. F02m 31/00,
F02b 75/20, F02b 33/10

[50] Field of Search .................................................. 123/41.17,
122 (D), 61, 61 (V), 62, 63, 70, 71, 58 (C), 65, 56
(C), 41.67, 41.68

[56] References Cited
UNITED STATES PATENTS

| 785,687 | 3/1905 | Tuck et al. | 123/122D |
|---|---|---|---|
| 886,519 | 5/1908 | Knickerbocker | 123/122D |
| 920,167 | 5/1909 | McIntyre | 123/122D |
| 942,782 | 12/1909 | Jones | 123/61 |
| 1,048,918 | 12/1912 | VanVleck | 123/61 |
| 2,129,172 | 9/1938 | Gehrandt | 123/71 |

FOREIGN PATENTS

| 25,116 | 1913 | Great Britain | 123/62 |
|---|---|---|---|
| 1,001,052 | 1/1957 | Germany | 123/41.17 |

Primary Examiner—Wendell E. Burns

ABSTRACT: This is a regenerative combustion cycle piston engine with a heat exchange chamber at the outside of a power cylinder, a compressor, a conveyance between the compressor and the heat exchange chamber and a rotary power takeoff.

Patented March 16, 1971 3,570,463
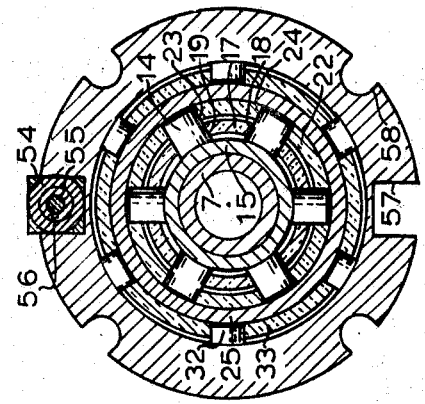
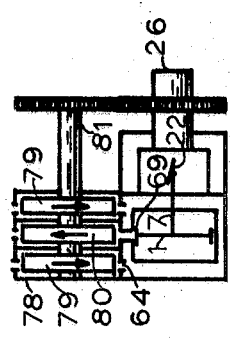
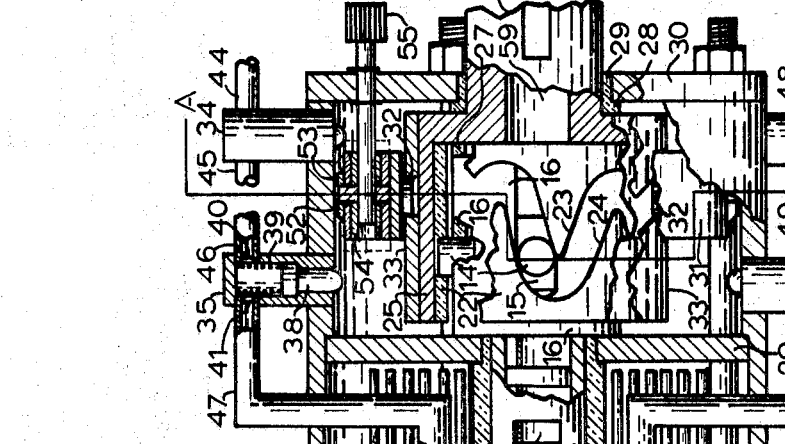
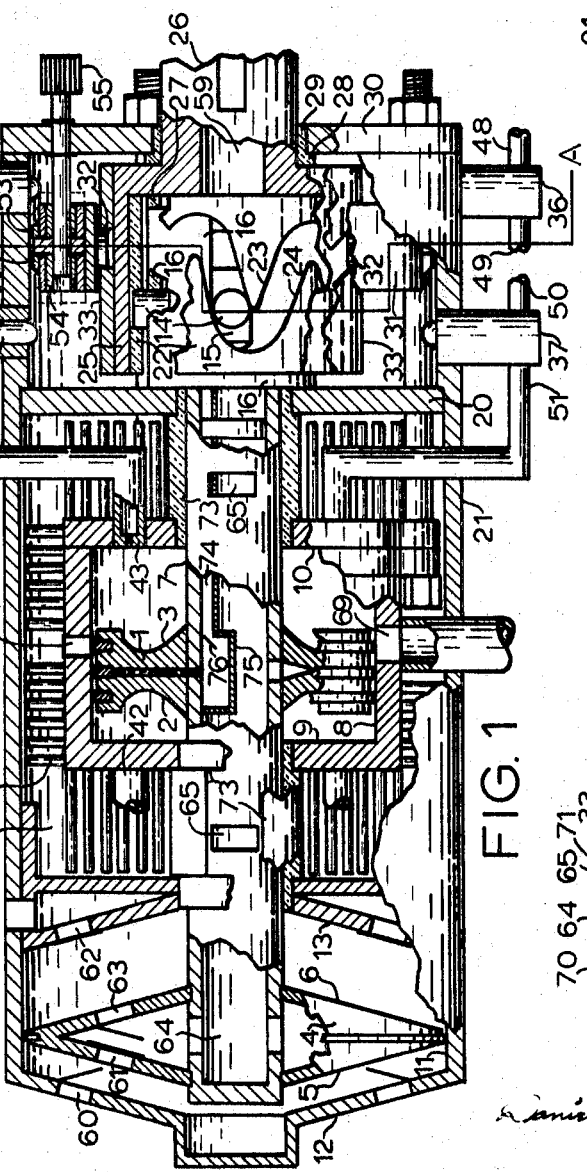
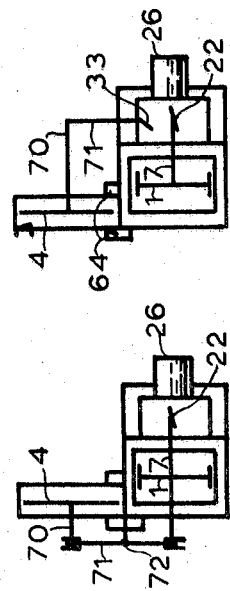
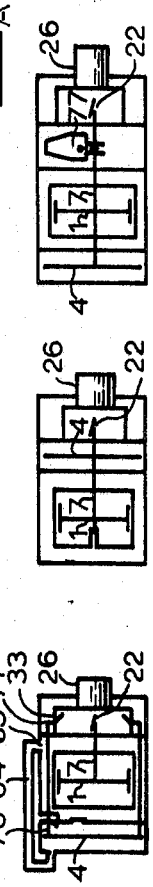
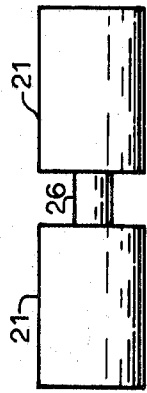
INVENTOR.
Daniel G. Nelson

REGENERATIVE COMBUSTION CYCLE PISTON ENGINE

This is a continuation-in-part of applications with Ser. No. 437,682, filed Mar. 8, 1965, Ser. No. 656,437, filed Jul. 27, 1967 and Ser. No. 684,377, filed Nov. 20, 1967 now all abandoned.

Objects of this invention are to provide an efficient, smog-free and light prime mover.

Smog is eliminated and efficiency is increased by precombustion heating of compressed and contained intake air through regenerative cooling of the power cylinder with partially compressed intake air. This is a two-staged compression system with regenerative heat transfer from combustion into intake air between the first and second stages of compression. Explained in another way, it is a supercharged heat engine with engine heat transferred to intake air after supercharge compression and before final compression.

Heated intake air provides several distinct advantages. It provides sufficient heat of working fluid for regenerative cycle ignition. Effective combustion heat is provided without requiring a substantial amount of fuel to raise the temperature of working fluids from compression temperature levels. Preheated combustion conditions assure rapid and complete combustion without unburned smog-producing emission. Heat otherwise lost to cooling systems is saved. Water can be added for steam pressure with a phase change instead of a temperature change by the addition of greater amounts of fuel heat. High local combustion temperature is not necessary to raise the heat of all working fluid to effective combustion heat. Using either water injection or low heat added, combustion heat can be kept low enough to avoid nitrogen compounds while yet obtaining complete combustion. Both high cylinder-wall heat and low-temperature combustion heat aid in eliminating smog and provide burning conditions that are optimum for complete combustion.

It is fundamental to this invention that regenerative heat not be added until he intake air is confined or compressed to some extent. It is also vital that pressure loss of the heated air be prevented by the escaping of the heated air through the power cylinder or through other outlets.

This invention is illustrated in the accompanying drawings as follows:

FIG. 1 is a detailed cutaway side view of the invention.

FIG. 2 is a cross section A—A view.

FIG. 3 is a schematic side view showing a form of the invention with a compressor piston actuated by a cam drive separately and in oppositely reciprocating travel from a power piston.

FIG. 4 is a schematic side view showing a form of the invention with a compressor piston positioned between a power piston and cam drive means on a power shaft.

FIG. 5 is a schematic side view showing a form of the invention with a pendulum-type vibration damper.

FIG. 6 is a schematic side view showing a form of the invention with two engines back-to-back with a common drive shaft to permit cancellation of vibration by counter reciprocation of the piston assembly in each engine.

FIG. 7 is a schematic side view showing a form of the invention with a compressor piston positioned parallel to a power piston and actuated in counterreciprocating travel to the power piston by lever action over a fulcrum to prevent vibration from reciprocation.

FIG. 8 is a schematic side view showing a form of the invention with a compressor piston positioned parallel to a power piston and actuated in counterreciprocating travel to the power piston by a vibration-damper cam drive attached to the cam drive gear to prevent vibration from reciprocation.

FIG. 9 is a schematic side view showing a form of the invention with a rotary compressor.

These improvements in a heat engine and displacement pump comprise: a power piston 1, a power piston front heat 2, a power piston rear head 3, a compressor piston 4, a compressor piston front head 5, a compressor piston rear head 6, a power shaft 7, a power cylinder 8, a power cylinder front head 9, a power cylinder rear head 10, a compressor cylinder 11, a compressor cylinder front head 12, a compressor cylinder rear head 13, drive members 14, a drive member boss 15, a transverse guide 16, transverse guide members 17, forward transverse guide surfaces 18, reverse transverse guide surfaces 19, a base plate 20, an engine frame 21, drive cam gears 22, a front drive cam bevel 23, a rear drive cam bevel 24, a drive shaft sleeve 25, a drive shaft 26, a front thrust bearing 27, a rear thrust bearing 28, a drive shaft bearing 29, a gear plate 30, a vibration damper 31, damper drive teeth 32, damper drive cams 33, front fuel pump 34, rear fuel pump 35, front auxiliary pump 36, rear auxiliary pump 37, pump plunger 38, pump spring 39, pump inlet valve 40, pump outlet valve 41, front fuel injector 42, rear fuel injector 43, front fuel supply line valve 44, front fuel injector line 45, rear fuel supply line 46, rear fuel injector line 47, front auxiliary supply line 48, front auxiliary injector and injector line 49, rear auxiliary supply line 50, rear auxiliary injector and injector line 51, front pump drive cam 52, rear pump drive cam 53, pump pawl bolt 54, throttle 55, throttle control member 56, fuel pump cam channel 57, damper transverse guide channel 58, reciprocative power access 59, front compressor inlet port with valve 60, front compressor outlet port with valve 61, rear compressor inlet port with valve 62, rear compressor outlet port with valve 63, air conveyance 64, air conveyance outlet port 65, heat exchange chamber 66, heat exchange members 67, power cylinder valved inlet port 68, power cylinder valved exhaust port 69, compressor piston drive shaft 70, compressor piston drive rod 71, compressor piston drive fulcrum 72, power shaft bearings 73, lubricant supply line 74, lubricant pump 75, lubricant pump valve 76, pendulous vibration damper 77, rotary compressor 78, rotary compressor blades 79, exhaust driven blades 80, and rotary compressor gear-driven shaft 81.

The operation of these improvements in heat engines and displacement pumps is accomplished in the following manner.

The double acting power piston 1 is caused to travel in reciprocating motion by receiving combustion at forward power piston head 2 at one end of each stroke and at rear power piston head 3 at the opposite end of each stroke. Air is compressed with compressor piston 4 by the front compressor piston head 5 when caused to travel in one direction and by the rear compressor piston head 6 when caused to travel the opposite direction.

The power and compressor pistons are both attached at substantially center positions thereof to power shaft 7 in the form of the invention shown in FIGS. 1, 3, 4, 5 and 6. The power shaft is extended from power cylinder 8 through front power cylinder head 9 and through rear power cylinder head 10 in slidable contact. The power shaft is extended into compressor cylinder 11 with front compressor head 12 and rear compressor head 13 and is in slidable contact with the rear compressor head.

Drive teeth 14 are attached by means of drive member boss 15 to the power shaft and extended radially in slidable contact with transverse guide sleeve 16 at transverse guide channels 17. Clockwise motion of the drive teeth and parts attached thereto is prevented by the contact of drive teeth with the forward transverse guide surfaces 18 at each transverse guide sleeve channel. Counterclockwise motion of the drive teeth is prevented in the same manner by contact of the drive teeth with the reverse transverse guide surfaces 19 at each transverse guide sleeve channel.

The transverse guide sleeve is attached rigidly to base plate 20. The base plate is attached rigidly to the engine frame 21. Transverse motion from the drive teeth is transferred thereby to the engine frame. The engine frame can be anchored to an outside support for obtaining work from rotary motion derived from this engine.

Reciprocating motion is transferred to rotary motion by slidable contact of the drive members with drive cam gears 22. The cam gears are relatively "crown-shaped" sleeves. Clockwise motion of the cam gears is caused by the repeated travel of the drive teeth against the front drive cam bevels 23 during the first combustion stroke of reciprocating travel and against rear drive cam bevels 24 during the second stroke of reciprocating travel. Counterclockwise motion is caused by travel of the drive members in repeated order against the rear drive cam bevels in the first stroke and against the front cam bevels in the second stroke. Rotary motion of the cam gear is completely reversible and will continue in the initial direction of rotary travel.

The drive cam gears are attached to or made a part of drive shaft sleeve 25. The drive shaft sleeve is attached to or made a part of drive shaft 26. Rotary motion of the drive cam gears is transferred from the drive shaft sleeve to the drive shaft for use.

Forward motion of the drive cam gears and shafts is prevented while rotary motion is permitted by front thrust bearing 27. Rearward motion is prevented in like manner by rear thrust bearing 28. The thrust bearings can be supported by drive shaft bearing sleeve 29 which is supported by gear plate 30 that is attached to the engine housing.

Vibration from reciprocating travel of the pistons, power shaft and drive teeth assembly is prevented by counter reciprocating travel of vibration damper 31 in the forms of the invention shown in FIGS. 1 and 4. Damper drive teeth 32 are in slidable contact with damper drive cam 33. The damper drive cams are attached to the drive shaft sleeve and are caused to rotate thereby. Counter-bevelled inclined plane cam movement of the damper drive cams causes the vibration damper to travel in reciprocative motion. Rotary motion of the vibration damper is prevented while reciprocating travel is permitted by slidable contact of the vibration damper transverse guide channels 58 with head bolts or other slidable contact surface supported by the engine housing. The damper drive cams are positioned with respect to the drive cam gears such that the drive teeth are caused to be at one end of a stroke when the damper drive teeth are at the opposite end of a stroke. The damper drive cams must have the same number of drive bevels in each direction as the drive cam gears. The angles of the bevels will be flatter for the damper drive cams than for the drive cam gears with equal distance of reciprocating travel, owing to the greater diameter of the damper drive cams. Additional flatness of the bevel angles of the damper drive cams can be obtained for a more advantageous driving effect, as compared to steeper angles for a more advantageous driven effect for the drive cam gears, by decreasing the lateral travel distance of the bevels and increasing the weight of the vibration damper proportionately beyond the weight of the power shaft assembly or by increasing the diameter of the damper drive cams.

Fuel is pumped into the power cylinder through the front power cylinder head from front fuel pump 34 when the power piston is at the front end of a stroke. Fuel is pumped into the rear end of the cylinder at the opposite end of the stroke by rear fuel pump 35.

Auxiliary material can be added owing to the preheated air. It is injected into the front and rear ends of the power cylinder by front auxiliary pump 36 and rear auxiliary pump 37 approximately when the fuel is added. Auxiliary material can be water, an oxidizer, steam, a coolant or other material from which pressure and or heat exchange advantages can be obtained. Injection of water when engine heat is sufficiently high has the multiple effects of: (A) increasing pressure from fuel heat added and thereby reducing fuel consumption by as much as 40 percent, (B) reducing engine heat to permit injection of additional fuel for increased combustion pressure for a further increase in engine power to weight, (C) preventing carbon deposits in the engine, and (D) reducing smog effects with lower combustion heat.

An oxidizer can be injected through the auxiliary pump for exoatmospheric or submerged operating conditions. The engine power-to-weight ratio for power generation under these conditions is particularly advantageous in addition to higher efficiency when compared to present systems of exoatmospheric power generation.

Steam can be added with or without other fuel through the auxiliary pump. Injection of steam only renders the engine a steam engine having the improved drive means employed for this invention. Other hot gasses can also be used for converting gas pressure to rotary motion. Adding steam with fuel adds pressure while cooling the engine much the same as adding water that changes to steam from fuel combustion heat within the cylinder as described above.

Pumping mode of operation for this invention is achieved by adding rotating power through the drive shaft and operating a piston in a cylinder having valves in the relationship shown for the compressor cylinder.

The fuel and auxiliary pumps are provided with plungers 38, springs 39, inlet valves 40, and outlet valves 41. Other types of pumps can be employed also in view of the advanced state of the art in injector pumps for liquid and gaseous fluids. For example, the plunger can also be used in port valve arrangement for pressurized gasses by locating the supply and injector line orifices parallel to the plunger piston heat at the walls of the pumps.

Front and rear fuel and auxiliary injectors are supplied with fuel and auxiliary fluid through corresponding front and rear supply and injector lines by appropriate attachment as shown for the front fuel injector, FIG. 1.

An adjustable stroke length for controlling fluid injection rate of the injectors is provided by separation of the front and rear pump drive cams 52 and 53. The plunger travel length is increased to pump more fluid by separating the cams to cause a greater portion of the cams to contact the plunger stem cam follower. The injector pumps are not actuated and no fluid is injected when the pump drive cams are in an inward position with respect to pump pawl bolt 54. The pump pawl bolt is provided with a circular ridge and left-hand threads on one side and right-hand threads on the other side. The ridge is in movable contact with a corresponding groove in the vibration damper such that the pawl is caused to travel with the damper towards the front and rear injectors at the ends of each stroke of the damper. Edges of the fuel pump cam match edges of the channel 56. The cam member for the front pump drive cam is provided with a cylindrical channel similar to a nut with threads engaging the portion of the pawl bolt in front of the circular ridge. The cam member for the rear pump, in a similar manner, is provided with a threaded channel to match the rearward side of the pawl bolt. Turning the pawl in one direction causes the cams to spread and turning it the other direction causes them to come together with respect to the anchored ridge during reciprocating motion. The pawl is turned in either direction, accordingly, by the turning of the throttle 55. The throttle is caused to engage the pawl in rotary motion but to remain stationary with respect to reciprocating travel of the pawl by means of a cylindrical channel and lateral groove in the pawl. The throttle and a protruding member thereon are inserted therein. The throttle can be prevented from reciprocating travel by snap rings at the point of contact of the throttle with the gear plate or allowed to reciprocate and be turned from outside the engine while either reciprocating or not reciprocating. A separate throttle and injection rate control means can be provided for both fuel and auxiliary pumps. A separate auxiliary pump cam channel 57 is provided.

Reciprocating power can be provided by direct attachment of a driven member to the power shaft through reciprocative power access 59. This can also be achieved by attachment to the power shaft through the front compressor head. The latter makes possible the simultaneous use of rotary and reciprocative power transfer.

Air for operating the engine in air breathing mode is drawn in through the front and rear compressor inlet valved ports 60 and 62 and pumped out of the compressor cylinder through front and rear outlet valved ports 61 and 63. Compressed air is conveyed through air conveyance 64 to air conveyance outlet ports 65. The air conveyance can be through the powershaft as shown in FIG. 1 or outside the cylinders as shown in FIGS. 3 and 8.

A heat exchange chamber 66 around the power cylinder and having heat exchange members 67 extended outwardly from the power cylinder is provided as an extension of the compressed air conveyance when the air regenerative features of the engine are employed. Wall heat of the engine is transferred to the compressed intake air prior to entry of the air into the power cylinder through power cylinder valved inlet ports 68. The air is directed into the power cylinder and further compressed after previous exhaust has been released through valved exhaust ports 69. Driving fuel or other fluid is injected at the compression end of each stroke.

Examples of some modifications contemplated as such are shown in FIGS. 3, 4, 5, 6, 7, 8, and 9. The essential elements in these changes are illustrated schematically for clarity and to avoid duplication. The object of the arrangement in FIG. 3 is to employ the compressor piston as the vibration damper. To accomplish this, the power shaft is connected to the power piston and a separate compressor piston drive shaft 70 is connected at separate points to the compressor piston. These compressor piston drive shafts are extended outside the power piston to the vibration damper drive cams and operated in counterreciprocating relationship to the power piston and power shaft. The cam groove angles are shown schematically as slanted lines. An airflow route directly from the rear compressor cylinder wall into the heat exchange chamber is shown. An air conveyance from the front compressor cylinder wall, bypassing the cylinders and entering the heat exchange chamber at the rear power cylinder head, is also shown.

The airflow could be directed through the compressor piston drive shafts to the heat exchange chamber in the manner shown in FIG. 1. The direct bypass airflow is shown to demonstrate another means of airflow than can be substituted within the contemplated scope of this invention.

The form of the invention shown in FIG. 4 demonstrates locating the compressor piston between the power piston and drive teeth for the purpose of providing heat insulation between the drive means and the power cylinder. In order to route air through the power shaft for cooling purposes, the hollow power shaft must be extended additionally into the heat exchange chamber. When the shaft is extended for this purpose, it adds a small amount of reciprocating weight but provides a reciprocative power access directly to the power piston.

Airflow through the power shaft for cooling is highly recommended. It increases the amount of fuel heat and pressure than can be added for an increase in power. It further reduces the weight of reciprocating parts by making possible the use of aluminum or thinner walls of other metal. The diameter of the shaft must be larger but the engine size is still less than results from the bypass channel.

The form of the invention shown in FIG. 5 demonstrates a pendulous vibration damper 77. It is operated directly off the power shaft and can be located at either end thereof. It is provided with a pivotal attachment to the engine housing and a slotted actuated in sliding contact with a rigid projection from the power shaft. A weight is at one end of the damper and the slotted actuator at the other end.

FIG. 6 demonstrates two engines with a common drive shaft that can be employed to cause the powershaft and pistons in each to be in counter reciprocating motion to cancel vibration. This form has some merits of lower friction but increases the weight per power output over a single engine with vibration damper.

FIG. 7 demonstrates a form of the invention with the power piston and compressor operated in parallel by a compressor piston drive rod 71 in pivotal contact with a compressor piston drive fulcrum 72. The object of this modification is to employ the compressor piston as a vibration damper.

FIG. 8 demonstrates a form of the invention with parallel counter vibrating operation of the pistons provided by a compressor piston drive rod 71 actuated by the vibration damper drive cam.

Lubrication of the power shaft bearings 73 can be accomplished by contact of the shaft with lubricant at the drive gears. Lubricant can be pumped to the piston rings from the drive gears through lubricant supply line 74. A lubricant pump 75 is provided with a one-way valve to arrest return exit while allowing lubricant to enter and be forced to the rings by momentum pressure of the lubricant at each directional change of reciprocating travel.

The form of this invention shown in FIG. 9 demonstrates the use of a rotary compressor 78 in place of a compressor piston. It can also be used as a compound engine to obtain power from the shaft and exhaust. It is provided with compressor blades 79, exhaust drive blades 80 and rotary compressor shaft drive 81 in gear-driven relationship to the drive shaft.

Various types of valves can be employed for the inlet and exhaust ports of this invention. Poppet valves, ball valves, butterfly valves or other types and actuation means can be used without departing from the invention scope.

I claim:
1. A regenerative combustion cycle piston engine having:
   a power piston in reciprocative relationship to the inside of a power cylinder,
   a heat exchanger in regenerative heat exchange relationship to the outside of a power cylinder;
   a compressor;
   a means of converting power from the power piston to the compressor;
   a conveyance from the compressor to the regenerative heat exchanger;
   a conveyance from the heat exchanger to the power cylinder;
   exhaust means from the power cylinder; and
   a means of rotary power takeoff that does not cause transverse side pressure of the piston on the cylinder walls.
2. In a regenerative combustion cycle piston engine substantially as described in claim 1:
   a rotary compressor; and
   rotary power transfer gears engaging the rotary power takeoff and a rotary gear to the compressor.
3. In a regenerative combustion cycle piston engine substantially as described in claim 1:
   a rotary compressor; and
   a gas operated turbine power transfer means in communication with exhaust gas from the power piston and with a turbine compressor.
4. In a regenerative combustion cycle piston engine substantially as described in claim 1: a connecting rod and crankshaft power takeoff means in contact with the power piston.
5. In a regenerative combustion cycle piston engine substantially as described in claim 1: a counterbevelled cam drive in contact with the power piston.
6. A regenerative combustion cycle piston engine having:
   a double-acting power piston in reciprocating relationship to the inside of a power cylinder;
   a double-acting compressor piston in reciprocative relationship to the inside of a compressor cylinder;
   a transverse guide in rigid contact with the power cylinder;
   a power shaft attached to the power piston;
   a counterbevelled cam drive power gear around the periphery of a drive member in rotatable contact with the power cylinder;
   cam drive members extended radially from the power shaft in slidable contact with the transverse guide and with the counterbevelled cam drive power gear;
   a means of communicating reciprocative travel from the power piston to the compressor;
   a fluid communication means between said two cylinders;
   a means of heat exchange from the power cylinder to the fluid communication means; and
   a fuel inlet means.
7. In a regenerative combustion cycle piston engine substantially as described in claim 6:
   a heat exchange chamber at the outside of the power cylinder; and, heat exchange members extended from the outside of the power cylinder into the heat exchange chamber.

8. In a regenerative combustion cycle piston engine substantially as described in claim 6:
- a hollow power shaft attached to the compressor piston and to the power piston; and,
- a means of fluid communication through the hollow power shaft from the compressor cylinder to the means of heat exchange.

9. In a regenerative combustion cycle piston engine substantially as described in claim 6:
- a hollow power shaft having a hollow piston attached at one end thereof, cam drive means attached to the other end and a power piston attached therebetween; and
- a means of fluid communication through the hollow power piston and the hollow power shaft and into the means of heat exchange.

10. In a regenerative combustion cycle piston engine substantially as described in claim 6:
- a hollow power shaft having the power piston attached at one end thereof, the drive member attached at the opposite end thereof and a hollow compressor piston attached therebetween to the hollow power shaft; and
- a means of fluid communication through the hollow power piston, through the hollow power shaft and into the means of heat exchange.

11. In a regenerative combustion cycle piston engine substantially as described in claim 6:
- a hollow shaft having the power piston attached at one end thereof, drive members attached at the opposite end thereof and a hollow compressor piston attached therebetween;
- a means of fluid communication and heat exchange through the hollow compressor piston, through the hollow power shaft and into the means of heat exchange; and
- a heat exchange at the outside of the power cylinder, and heat exchange members extended from the power cylinder into the heat exchange chamber.

UNITED STATES PATENT OFFICE
CERTIFICATE OF CORRECTION

Patent No. 3,570,463      Dated March 16, 1971

Inventor(s) Daniel E. Nelson

It is certified that error appears in the above-identified patent and that said Letters Patent are hereby corrected as shown below:

On the cover sheet [72] "Box 576 Pacific Grove, Calif. should read -- 2925 David Ave., Pacific Grove, Calif. 93950

Signed and sealed this 20th day of July 1971.

(SEAL)
Attest:

EDWARD M. FLETCHER, JR.            WILLIAM E. SCHUYLER, JR
Attesting Officer                 Commissioner of Patents